United States Patent [19]

Larsson

[11] 4,066,010
[45] Jan. 3, 1978

[54] AUTOMATIC BASTER

[76] Inventor: Kim Larsson, 825 W. 71st Ave., Apt. No. 204, Vancouver, British Columbia, Canada

[21] Appl. No.: 762,886

[22] Filed: Jan. 27, 1977

[51] Int. Cl.² .................. A47J 27/52; A47J 37/10
[52] U.S. Cl. ................................................ 99/346
[58] Field of Search ....................... 99/345, 346, 347

[56] References Cited

U.S. PATENT DOCUMENTS

| | | | |
|---|---|---|---|
| 2,560,605 | 7/1951 | Shell | 99/346 |
| 3,224,362 | 12/1965 | Kozar | 99/346 |
| 3,713,378 | 1/1973 | West et al. | 99/346 |
| 3,922,960 | 12/1975 | Lewis | 99/346 |

Primary Examiner—Leonard D. Christian
Attorney, Agent, or Firm—Allen D. Brufsky

[57] ABSTRACT

Automatic basting apparatus including an inverted U-shaped standard positioned in a roasting pan partially filled with water. The legs of the standard are hollow, as well as the bight portion. Holes are provided in the bight portion to dispense condensed steam or meat or fowl roasted in the pan. As the water in the pan boils, it rises through the legs and condenses in the bight portion and is passed through the holes to provide a continuous basting action. The legs of the standard are split and connected by tubular sleeves to adjust the height of the bight portion relative to the food being roasted.

5 Claims, 2 Drawing Figures

AUTOMATIC BASTER

BACKGROUND OF THE INVENTION

This invention relates to cooking apparatus, and more particularly, apparatus for basting meat or fowl.

When meat or fowl is roasted, it is necessary to occasionally baste the food so that the same will not become dried out, tough, and tasteless. This invention provides an apparatus for automatically basting meat or fowl as it is being roasted.

SUMMARY OF THE INVENTION

In accordance with the invention, a roasting pan is partially filled with water and a tubular U-shaped standard is supported in the water by a pair of oval-shaped feet. The standard extends over the meat and fowl and may include lateral tubular projections. Holes are provided in the tubular standard and an extension tube is connected to the opposed legs of the standard so that the standard may be elevated or lowered relative to the meat or fowl being roasted, depending upon the size of the food item. As the water boils and is mixed with the juices from the meat or fowl, it will rise through the interior of the standard, condense, and be automatically dispensed through the holes in the standard to baste the food or meat.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
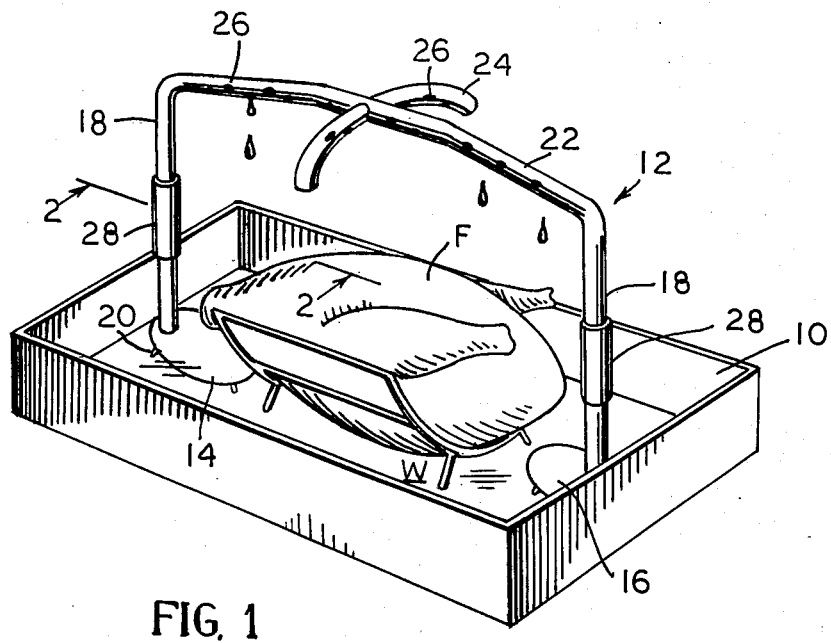
FIG. 1 is a perspective view of the basting apparatus of the present invention mounted in a roasting pan.
Figure 2:
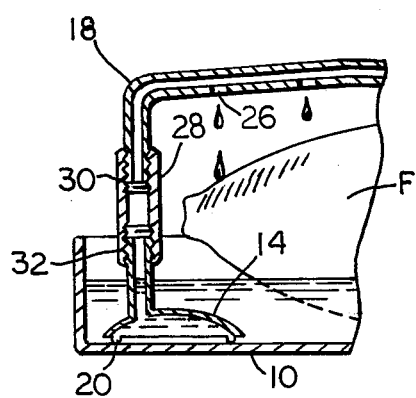
FIG. 2 is a cross-sectional view taken substantially along the plane indicated by line 2—2 of FIG. 1.

Referring now to the drawing in detail, wherein like numerals indicate like elements throughout the several views, a roasting pan 10 for roasting meat or a fowl F is partially filled with water W.

A tubular U-shaped standard generally designated by the numeral 12 is supported in the bottom of pan 10 in water W by a pair of oval-shaped feet 14, 16 connected to the opposite legs 18 of standard 12. Feet 14 and 16 include integral pegs 20 to elevate the feet above the bottom of pan 10 so liquid may seep beneath the feet.

Standard 12 is hollow and has a bight portion 22 which extends over the fowl F and may include lateral extensions 24. Holes 26 provided in bight portion 22 and extensions 24.

Each leg 18 is split and each part is received in opposite threaded engagement with a tubular extender 28 having left and right handed internal threads 30, 32 respectively, at the top and bottom thereof. By rotating extender 28, the bight 22 of standard 12 can be raised or lowered relative to fowl F being roasted in pan 10, depending upon the size of the food item.

In use, as water W in pan 10 boils, and is mixed with the juices from fowl F, the water or steam generated will rise in legs 18 and condense in bight portion 22. The water will be dispensed through holes 26 to continuously baste fowl F.

While a specific embodiment of an automatic baster has been disclosed in the foregoing description, it will be understood that various modifications within the spirit of the invention may occur to those skilled in the art. Therefore, it is intended that no limitations be placed on the invention except as defined by the scope of the appended claims.

I claim:

1. An automatic baster comprising:
    an inverted substantially U-shaped standard adapted to be placed in a roasting pan partially filled with water, said standard including
    a pair of tubular legs connected by a tubular bight portion, said bight portion including a plurality of holes to allow the passage of liquid therethrough, and
    means connected to said legs for raising and lowering said legs relative to said pan.
2. The baster of claim 1 wherein each of said legs are split and have oppositely threaded ends, and said means includes a tubular sleeve connected to the threaded ends of each of said legs.
3. The baster of claim 2 wherein said bight portion includes a pair of lateral tubular extensions each of which has a plurality of holes therethrough.
4. The baster of claim 3 wherein each leg of said baster includes a hollow foot.
5. The baster of claim 4 wherein each of said feet is elevated by integral pins.